(12) United States Patent
Simpson et al.

(10) Patent No.: US 9,138,668 B2
(45) Date of Patent: *Sep. 22, 2015

(54) DEWATERING OF DRILLING MUD USING A FILTER PRESS

(75) Inventors: Daniel J. Simpson, Rio Vista, CA (US); Ferdinand Kogler, Rio Vista, CA (US)

(73) Assignee: Daniel J. Simpson, Rio Vista, CA (US)

( * ) Notice: Subject to any disclaimer, the term of this patent is extended or adjusted under 35 U.S.C. 154(b) by 779 days.

This patent is subject to a terminal disclaimer.

(21) Appl. No.: 12/709,218

(22) Filed: Feb. 19, 2010

(65) Prior Publication Data

US 2011/0203999 A1    Aug. 25, 2011

(51) Int. Cl.
*B01D 25/00* (2006.01)
*B01D 37/00* (2006.01)
(Continued)

(52) U.S. Cl.
CPC .............. *B01D 35/18* (2013.01); *B01D 25/12* (2013.01); *B01D 25/127* (2013.01);
(Continued)

(58) Field of Classification Search
CPC ........ C02F 1/52; B01D 35/18; B01D 25/322; B01D 25/32; B01D 25/127; B01D 37/02; B01D 37/03; B01D 21/01; B01D 36/00; B01D 36/03; B01D 25/12; B01D 25/121; B01D 25/122; B01D 25/124; B01D 25/125; B01D 25/1275; B01D 25/14; B01D 25/164; B01D 25/215; B01D 25/285; B01D 25/172; B01D 33/042; E21B 21/063; E21B 21/065; E21B 21/066
USPC ............ 210/748.07, 231, 204, 770, 702, 723, 210/780, 806, 772, 773, 224, 225, 226, 227, 210/228, 229, 230; 175/66, 206, 207
See application file for complete search history.

(56) References Cited

U.S. PATENT DOCUMENTS

| 3,048,928 A | 8/1962 | Copson et al. ...................... 34/1 |
| 4,108,777 A | 8/1978 | Kurita et al. |

(Continued)

FOREIGN PATENT DOCUMENTS

| EP | 0062543 A1 * | 10/1982 | .............. C02F 11/14 |
| GB | 2134403 A * | 8/1984 | .............. B01D 37/00 |

OTHER PUBLICATIONS

International Search Report and Written Opinion Issued Feb. 23, 2010 for International PCT Patent Application Serial PCT/US09/05956.

(Continued)

*Primary Examiner* — Nam Nguyen
*Assistant Examiner* — Nader Hossaini
(74) *Attorney, Agent, or Firm* — Pillsbury Winthrop Shaw Pittman LLP (57) ABSTRACT

A method of separating a mixture of liquid and insoluble solids in a filter press may comprise: diluting the mixture; adding a flocculating agent to the diluted mixture and stirring to form a chemically processed mixture; pumping the chemically processed mixture into a chamber between two filter plates in the filter press to form a filter cake, wherein the chamber is lined by filter cloths, and wherein, during the pumping, filtrate is forced through the filter cloths and out of the chamber; heating the filter cake in the chamber, wherein, during the heating, filtrate is forced through the filter cloths and out of the chamber; and releasing dried filter cake from the chamber. Furthermore, before the diluting, additional solids may be added to the mixture. The method may be used to dewater drilling mud, and mixtures of drilling mud with drill cuttings.

36 Claims, 11 Drawing Sheets

(51) Int. Cl.

| | | |
|---|---|---|
| *C02F 1/00* | (2006.01) | |
| *C02F 1/30* | (2006.01) | |
| *C02F 1/52* | (2006.01) | |
| *B01D 35/18* | (2006.01) | |
| *B01D 25/28* | (2006.01) | |
| *B01D 25/12* | (2006.01) | |
| *E21B 21/01* | (2006.01) | |
| *E21B 21/06* | (2006.01) | |
| *B01D 25/164* | (2006.01) | |
| *B01D 25/127* | (2006.01) | |
| *B01D 25/32* | (2006.01) | |
| *B01D 37/03* | (2006.01) | |

(52) U.S. Cl.
CPC ........... *B01D 25/164* (2013.01); *B01D 25/285* (2013.01); *B01D 25/32* (2013.01); *B01D 37/03* (2013.01); *C02F 1/52* (2013.01); *E21B 21/01* (2013.01); *E21B 21/066* (2013.01)

(56) References Cited

U.S. PATENT DOCUMENTS

| | | | | |
|---|---|---|---|---|
| 4,482,459 | A | | 11/1984 | Shiver |
| 4,544,490 | A | | 10/1985 | Erickson et al. |
| 4,617,863 | A | | 10/1986 | Kenyon ......................... 100/194 |
| 4,740,413 | A | | 4/1988 | Wildner ......................... 428/198 |
| 4,839,045 | A | | 6/1989 | Wildner ......................... 210/228 |
| 4,995,972 | A | | 2/1991 | Kramer et al. ................. 210/179 |
| 5,087,375 | A | | 2/1992 | Weinwurm |
| 5,641,070 | A | * | 6/1997 | Seyffert ......................... 210/389 |
| 5,672,272 | A | | 9/1997 | Baer ............................. 210/231 |
| 6,149,806 | A | | 11/2000 | Baer ............................. 210/231 |
| 6,180,002 | B1 | | 1/2001 | Higgins ......................... 210/185 |
| 6,280,638 | B1 | | 8/2001 | Belchev |
| D452,295 | S | | 12/2001 | Ricketts ......................... D23/207 |
| 6,689,925 | B2 | * | 2/2004 | Malhis .......................... 585/240 |
| 7,097,761 | B2 | | 8/2006 | Kresnyak ...................... 208/187 |
| 7,309,408 | B2 | | 12/2007 | Benavides ..................... 204/520 |
| 7,422,680 | B2 | | 9/2008 | Sheets, Sr. .................... 210/143 |
| 8,535,542 | B2 | * | 9/2013 | Simpson et al. ........... 210/748.07 |
| 2001/0021428 | A1 | | 9/2001 | Simpson et al. ............. 428/36.5 |
| 2003/0023149 | A1 | * | 1/2003 | Montemagno et al. ....... 600/300 |
| 2003/0083532 | A1 | | 5/2003 | Malhis |
| 2004/0084380 | A1 | | 5/2004 | Kicinski ........................ 210/748 |
| 2004/0149649 | A1 | | 8/2004 | Uchiyama ..................... 210/600 |
| 2006/0032805 | A1 | | 2/2006 | Hildebrant et al. ........... 210/228 |
| 2006/0131224 | A1 | | 6/2006 | Hibble .......................... 210/224 |
| 2007/0125693 | A1 | | 6/2007 | Lindley ......................... 210/224 |
| 2008/0082093 | A1 | | 4/2008 | Prakash et al. ................ 606/33 |
| 2008/0190831 | A1 | * | 8/2008 | Marchek ....................... 210/231 |
| 2008/0210467 | A1 | | 9/2008 | Eia |
| 2008/0296208 | A1 | * | 12/2008 | Ikeyama et al. ................ 210/87 |
| 2010/0116755 | A1 | * | 5/2010 | Simpson et al. ......... 210/748.07 |

OTHER PUBLICATIONS

*Macrowave™ Filter Press Cake Drying System*, see: http://www.radiofrequency.com/products/filterpress.html last viewed May 21, 2010.

*Drilling Fluid*, Wikipedia Article, see: http://en.wikipedia.orq/wiki/Drilling fluid last viewed May 24, 2010.

*Drilling Waste Management Technology Descriptions*, see: http://web.ead.anl.gov/dwm/techdesc/index.cfm last viewed May 24, 2010.

International Search Report and Written Opinion issued for PCT/US2011/24341 on Apr. 12, 2011.

International Search Report and Written Opinion issued for PCT/US2011/23310 on Mar. 23, 2011.

* cited by examiner

SECTION N-N

FIG. 7

SECTION Y-Y

FIG. 8

FIG. 9
SECTION Z-Z

DEWATERING OF DRILLING MUD USING A FILTER PRESS

FIELD OF THE INVENTION

The invention relates to systems and methods for separation of mixtures of liquids and insoluble solids in filter presses, the mixtures including drilling muds with and without additional solids such as drill cuttings.

BACKGROUND OF THE INVENTION

Drilling boreholes in the earth, for oil wells for example, involves the use of drilling mud and generates drill cuttings. Drilling muds, or fluids, typically comprise: a base fluid (such as water, oil, or a synthetic compound); weighting agents (such as barium sulfate); bentonite clay to help remove cuttings from the well and to form a filter cake on the walls of the borehole; lignosulfonates and lignites to keep the mud in a fluid state; and various additives, as required. Drill cuttings are solids removed from the borehole while drilling the well. Although sand and shale make up the majority of cuttings for oil wells, depending on the location, other geological formations may be encountered. Drill cuttings are usually removed from the drilling mud by flowing the drilling mud over shale shakers. Multiple shale shakers with progressively finer mesh screens may be used to remove enough of the drill cuttings to permit reuse of the drilling mud. However, in some circumstances, after flowing over shale shakers the drilling mud may still retain too many fine particulates for reuse.

After separation from the drilling mud in a shale shaker, the drill cuttings often retain a significant amount of drilling mud, which it may be desirable to recover. Furthermore, it may be necessary to recover some of the drilling mud from the drill cuttings before the drill cuttings can be properly disposed of according to local environmental regulations. There is a need for efficient methods and equipment for recovery of drilling mud from drill cuttings.

When drilling mud becomes too contaminated, or it is no longer needed, it must be reclaimed or disposed of in a way that satisfies local environmental regulations. To satisfy these regulations, and/or to reduce the weight of material that must be hauled off to certified disposal facilities, processing of the drilling mud may be necessary. This processing may include dewatering of the drilling mud. There is a need for efficient methods and equipment for dewatering of drilling mud.

In conclusion, there is a need for environmentally friendly methods of disposing of drill cuttings and drilling muds, and for equipment for implementing these methods.

SUMMARY OF THE INVENTION

The present invention relates generally to separation of mixtures of liquids and insoluble solids in filter presses. The separation of liquids and insoluble solids includes dewatering/drying. The separated liquid and solids are generally referred to as filtrate and filter cake, respectively. Some embodiments of this invention are methods for separation of the mixtures of liquids and insoluble solids which include chemical treatment of the mixtures prior to processing in the filter press. The chemical treatment may include dilution of the mixture followed by addition of flocculating agent(s). Further embodiments of this invention are methods for separation of the mixtures of liquids and insoluble solids which include addition of extra solids prior to processing in the filter press. The present invention may provide a method and equipment for dewatering/drying of drilling muds, and drilling muds mixed with drill cuttings.

According to aspects of the invention, a method of separating a mixture of liquid and insoluble solids in a filter press may comprise: diluting the mixture; adding a flocculating agent to the diluted mixture and stirring to form a chemically processed mixture; pumping the chemically processed mixture into a chamber between two filter plates in the filter press to form a filter cake, wherein the chamber is lined by filter cloths, and wherein, during the pumping, filtrate is forced through the filter cloths and out of the chamber; heating the filter cake in the chamber, wherein, during the heating, filtrate is forced through the filter cloths and out of the chamber; and releasing dried filter cake from the chamber. During the heating, the chamber may be vacuum pumped to facilitate removal of filtrate vapor. The heating may be radio frequency heating. The method may further comprise, before the diluting, adding additional solids to the mixture. The method may be used to dewater drilling mud, and mixtures of drilling mud with drill cuttings.

According to further aspects of the invention, a filter press system for separating a mixture of liquid and insoluble solids may comprise: a frame; a plurality of filter plates configured to form a stack of parallel plates, each of the plurality of filter plates being movably attached to the frame, the plurality of filter plates further being configured to form a multiplicity of chambers, each of the multiplicity of chambers being formed by adjacent filter plates of the plurality of filter plates, each of the multiplicity of chambers being lined by filter cloths, wherein the plurality of filter plates, the multiplicity of chambers and the filter cloths are configured to allow filtrate to escape from the chambers while retaining solids from the mixture to form a filter cake; a tank configured for chemical processing of the mixture; a pump for pumping the chemically processed mixture from the tank into the multiplicity of chambers; and a heater for heating filter cake in the multiplicity of chambers. The heater may be a radio frequency heater. Furthermore, a vacuum pump may be connected to the multiplicity of chambers to assist in removal of filtrate from the filter cake in the chambers.

According to aspects of the invention, a method of separating a mixture of liquid and insoluble solids in a filter press may comprise: providing the mixture; adding additional solids to the mixture to form a solids-enriched mixture; pumping the solids-enriched mixture into a chamber between two filter plates in the filter press to form a filter cake, wherein the chamber is lined by filter cloths, and wherein, during the pumping, filtrate is forced through the filter cloths and out of the chamber; heating the filter cake in the chamber, wherein, during the heating, filtrate is forced through the filter cloths and out of the chamber; and releasing dried filter cake from said chamber. During the heating, the chamber may be vacuum pumped to facilitate removal of filtrate vapor. The heating may be radio frequency heating. The mixture may be drilling mud and the additional solids may be drill cuttings. The method may further comprise diluting the solids-enriched mixture, adding a flocculating agent and stirring to form a chemically processed solids-enriched mixture, before pumping the mixture into the filter press.

According to further aspects of the invention, a filter press system for separating a mixture of liquid and insoluble solids may comprise: a frame; a plurality of filter plates configured to form a stack of parallel plates, each of the plurality of filter plates being movably attached to the frame, the plurality of filter plates further being configured to form a multiplicity of chambers, each of the multiplicity of chambers being formed by adjacent filter plates of the plurality of filter plates, each of the multiplicity of chambers being lined by filter cloths, wherein the plurality of filter plates, the multiplicity of chambers and the filter cloths are configured to allow filtrate to escape from the chambers while retaining solids from the mixture to form a filter cake; a mixing vessel configured to mix additional solids into the mixture to form a solids-enriched mixture; a transfer mechanism for moving the solids-enriched mixture from the mixing vessel to the multiplicity of chambers; and a heater for heating filter cake in the multiplicity of chambers. The mixing vessel may be an elongated drum rotatable about its longitudinal axis, the longitudinal axis being at roughly 45 degrees to the horizontal—an example of a suitable mixing vessel being a cement mixer. The heater may be a radio frequency heater. Furthermore, a vacuum pump may be connected to the multiplicity of chambers to assist in removal of filtrate from the filter cake in the chambers.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention relates generally to separation of mixtures of liquids and insoluble solids in filter presses. The separation of liquids and insoluble solids includes dewatering/drying. The separated liquid and solids are generally referred to as filtrate and filter cake, respectively. Some embodiments of this invention are methods for separation of the mixtures of liquids and insoluble solids which include chemical treatment of the mixtures prior to processing in the filter press. The chemical treatment may include dilution of the mixture followed by addition of flocculating agent(s). Further embodiments of this invention are methods for separation of the mixtures of liquids and insoluble solids which include addition of extra solids prior to processing in the filter press. For example, embodiments of the present invention may include dewatering of drilling muds involving mixing drill cuttings into the drilling mud prior to dewatering. Furthermore, the present invention is not limited to dewatering of drilling muds—the teaching and principles of the present invention may be applicable to processing the contents of tailing ponds from mining, strip mining, etc., and to the dewatering of muds generally.

Figure 1:
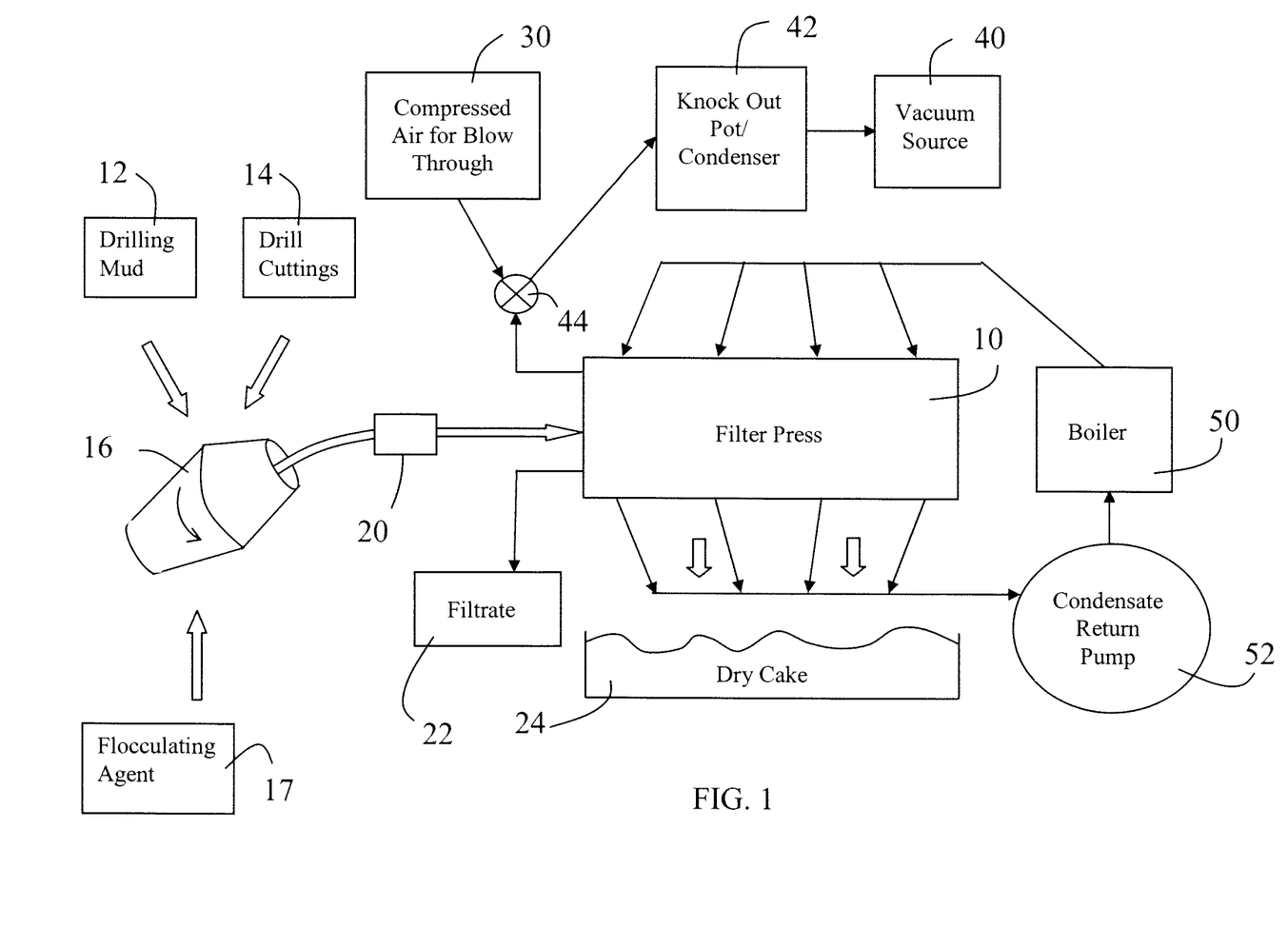
FIG. 1 is a schematic of a filter press system, according to some embodiments of the present invention.

FIG. 1 shows a schematic of a filter press system which is representative of those manufactured and installed worldwide by DES, Inc., DryVac Canada, Ltd. and affiliated companies; although, the present invention is not limited to these particular filter presses—many different filter presses may be used with some embodiments of the present invention, as will be appreciated by those skilled in the art after reading the detailed description of the present invention. FIG. 1 shows a filter press 10 for processing drilling mud 12, or a mixture of drilling mud 12 and drill cuttings 14, to produce a filtrate 22 and a dry filter cake 24. The dry filter cake 24 is released from the filter press as indicated by the large arrows, as described in more detail below, and is collected in a tray, on a conveyor belt below the filter press, or in any other removal device. In this example, a pre-processed drilling mud 12 is described as being fed into the filter press 10 for separation, however, a wide range of mixtures of liquid and insoluble solids may be separated using this system. The filter press system includes: an air compressor 30 for forcing air through the cake in the filter press to remove filtrate; a vacuum source 40 connected to a knock out pot/condenser 42 and then to the filter press 10 through a valve 44; and a boiler 50 for generating steam connected in a closed circuit to the filter press 10 and a condensate return pump 52—the direction of flow for the steam into the filter press and the condensate out of the filter press is indicated by the arrows. The vacuum source 40 is used to apply a vacuum to the filter cake in the filter press to remove filtrate (as either a liquid or a vapor). Note that the valve 44 is used to isolate either or both the air compressor 30 and/or the vacuum source 40 depending on what is required in a particular processing step in the filter press. The knock out pot part of 42 is basically a low velocity flow part of the vacuum line where filtrate may be collected; the condenser part of 42 condenses any filtrate present in vapor form. The boiler 50 produces steam, at approximately 15 psi, for heating the filter press 10 and/or inflating envelopes in the filter plates in the filter press, as described in more detail below.

Figure 2:
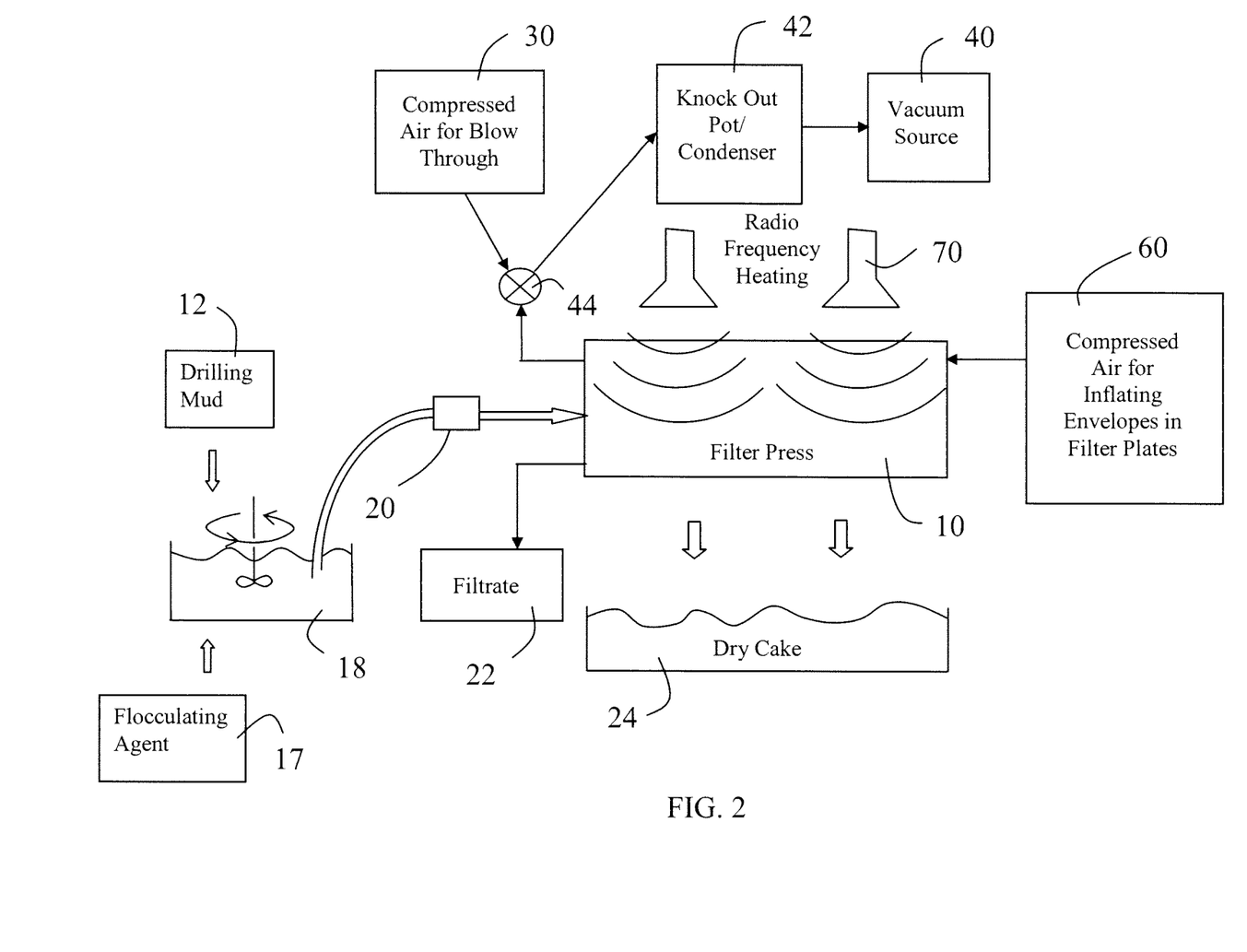
FIG. 2 is a schematic of a filter press system including radio frequency heating, according to aspects of the present invention.

When drilling mud alone is processed in the filter press system, as shown in FIG. 2, the drilling mud 12 is provided directly to a mixing tank 18, where it is diluted, a flocculating agent 17 is added while agitating/stirring, the contents of the tank are agitated/stirred until a thick flock is formed, and then the agitation/stirring is stopped allowing the floc to settle to the bottom of the tank 18. The dilution is typically with water, increasing the volume two to four times that of the undiluted drilling mud, for example. The dilution process includes blending the drilling mud and water to provide a uniform solution. The purpose of the dilution is to facilitate mixing the drilling mud with the flocculating agent. Flocculation is the process where colloids come out of suspension in the form of aggregates or floc—this differs from precipitation in that, prior to flocculation, colloids are merely suspended in a liquid and not actually dissolved in a solution. Flocculants are used in drilling mud treatment to improve sedimentation and thus the effectiveness of processing the mud in the filter press. Many flocculants are multivalent cations such as aluminum, iron, calcium or magnesium. For example, alum is an aluminum-based mineral flocculant used to clarify drilling mud by catching the very fine suspended particles in a gel-like precipitate of aluminium hydroxide. In place of, or in addition to, mineral flocculants, synthetic flocculants may be used. Some examples of synthetic flocculants include polymers such as anionic and cationic polyacrylamides.

An example of chemical processing with a flocculating agent is as follows. The drilling mud in the mixing tank is mixed with agitators. A 350 ml sample of the mud is used to determine the amount of alum required for the mud in the mixing tank. The sample is stirred and alum is added in 1 ml increments until the pH reaches somewhere in the range of 6.2-6.9; this dose of alum is then used to calculate the amount of alum needed for the volume of drilling mud in the mixing tank. Next, an anionic water soluble polymer, such as the drilling fluid additive Alkapam A-1703 (available from Diversity Technologies Corp, Edmonton, Alberta, Canada), is added in 1 ml increments to the sample of alum-treated drilling mud while stirring until floc forms and free water is observed. The stirring is continued and if the floc breaks down more anionic water soluble polymer is added until a tight floc is formed and the water looks clear. This dose of anionic water soluble polymer is then used to calculate the amount of alum needed for the volume of drilling mud in the mixing tank. The calculated amount of alum is added to the drilling mud in the mixing tank while agitating the mud, followed by adding the calculated amount of anionic water soluble polymer to the drilling mud mixture in the mixing tank while agitating the mud. Note that in some circumstances—described in more detail below—a cationic polyacrylamide, such as the drilling fluid additive Alkapam C-1803 (available from Diversity Technologies Corp, Edmonton, Alberta, Canada), is added to the drilling mud after the anionic water soluble polymer. The dose of cationic polyacrylamide is determined by adding 1 ml amounts to the mud sample already treated with alum and anionic water soluble polymer until a stable floc forms. This dose of cationic polyacrylamide is then used to calculate the amount of cationic polyacrylamide needed for the volume of drilling mud in the mixing tank. The calculated amount of cationic acrylamide is added to the drilling mud in the mixing tank after the alum and anionic water soluble polymer, while agitating the mud mixture. Note that the flocculants are added serially.

The circumstances in which the use of a cationic polyacrylamide is considered are described as follows. When the mud sample is treated with alum and an anionic water soluble polymer, as described above, and does not exhibit good flocculation and separation of solids and water within a short time, for example two minutes, then a dewatering test is carried out. The dewatering test assesses the dewatering characteristics of the mixture, and if found unacceptable, a cationic polyacrylamide may be added to further improve the dewatering characteristics.

After dilution and flocculation, the contents of the mixing tank 18 are pumped into the filter press 10 using a pump 20. The pump 20 may be a low shear pump, such as a hydraulic concrete pump or similar pump. Alternatively, after dilution and flocculation, the floc may be allowed to settle in the tank 18, leaving clear liquid at the top of the tank; this clear liquid may be siphoned off before pumping the floc into the filter press 10 using a low shear pump. The siphoned liquid may separately be chemically treated and/or filtered. The chemically processed drilling mud mixture is dried in the filter press 10 as described below with reference to FIGS. 3A-3D. Furthermore, after drying the chemically processed mixture in the filter press, more of the chemically processed mixture may be pumped into the filter press, without emptying the chambers, and dried in the filter press; this process flow may be used when the total solids load in the chemically processed mixture is low and the solids capacity of the chambers in the filter press have not yet been reached.

Figure 4:
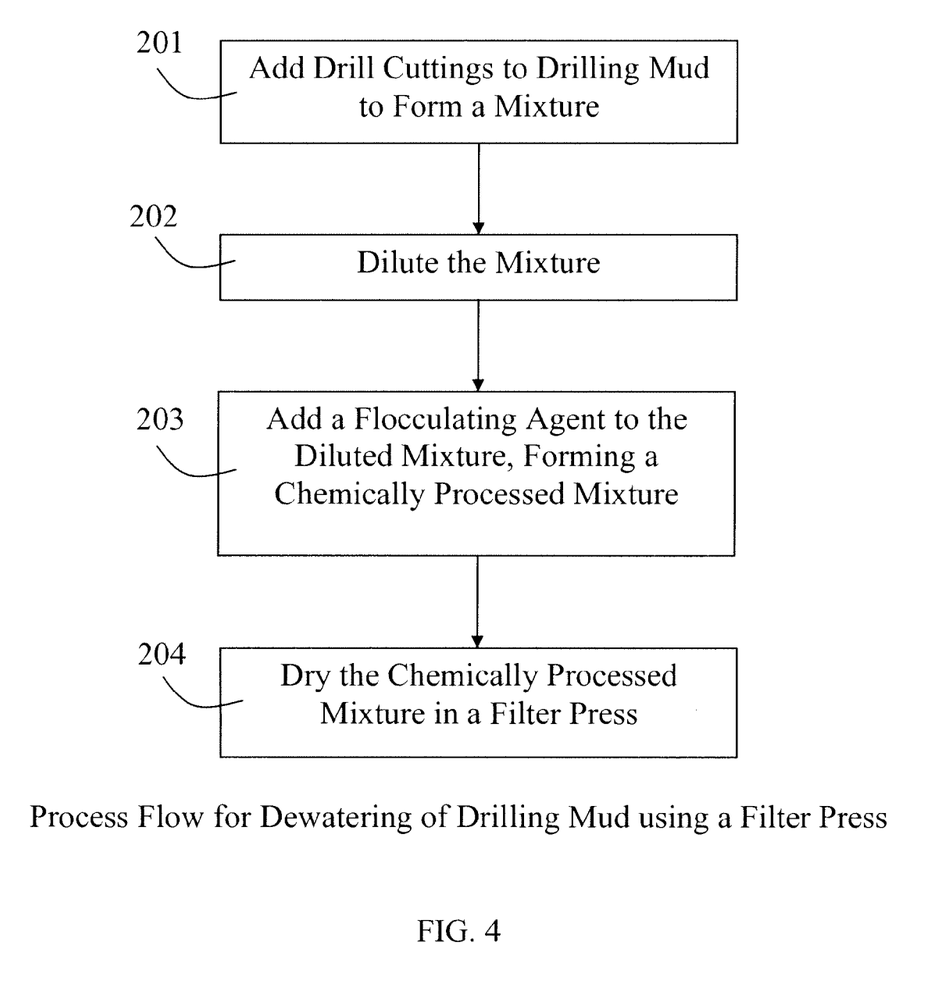
FIG. 4 is a process flow for separation of a mixture of liquid and insoluble solids using a filter press, according to some embodiments of the present invention.

When drilling mud is combined with drill cuttings for processing in the filter press system, as shown in FIG. 1, the drilling mud 12 and drill cuttings 14 are combined in a mixing vessel 16, such as a commercially-available cement/concrete mixer or other relatively low shear mixing vessel. (The mixing vessel may be an elongated drum rotatable about its longitudinal axis, the longitudinal axis being at roughly 45 degrees to the horizontal.) The drilling mud and drill cuttings are mixed in the mixing vessel until a homogeneous slurry is formed; the slurry has a significantly higher solids load than the drilling mud alone. A typical mixture consists of one part drilling mud to one part drill cuttings. Next, the slurry is diluted and chemically processed with a flocculating agent, as described above. here, the dilution and chemical processing conveniently occurs in the mixing vessel. An example of such a process flow for dewatering drilling mud using a filter press is shown in FIG. 4. The process of FIG. 4 comprises: adding drill cuttings to the drilling mud to form a mixture (201); diluting the mixture (202); adding a flocculating agent to the diluted mixture, forming a chemically processed mixture (203); and drying the chemically processed mixture in a filter press (204). Furthermore, after drying the chemically processed mixture in the filter press, more of the chemically processed mixture may be added to the chambers of the filter press, without emptying the chambers, and dried in the filter press; this process flow may be used when the total solids load in the chemically processed mixture is low and the solids capacity of the chambers in the filter press have not yet been reached. Note that in a variation of the process flow of FIG. 4, the drilling mud may be diluted prior to mixing with the drill cuttings. In a further variation, the homogeneous slurry formed by mixing drilling mud and drill cuttings may be directly transferred to the filter press for dewatering without chemical processing.

FIG. 2 shows a schematic of a filter press system including radio frequency heating, according to some embodiments of the present invention. FIG. 2 shows a specific example of the radio frequency heating—radio frequency sources 70, such as microwave sources. The microwave sources generate radio waves shown propagating into the filter press 10 where the filter cake absorbs some of the radio frequency energy and heats up. Other than the radio frequency heating, the system of FIG. 2 operates very similarly to the system of FIG. 1. Comparing FIGS. 1 & 2, it is seen that in FIG. 2 the steam supply has been replaced by an air compressor 60. Heating using radio frequency may be more efficient than using steam, and therefore removes the need for steam. However steam may be used in combination with radio frequency heating, if desired. Regarding inflation of the envelopes in the filter plates, compressed air alone may be used.

In some embodiments of the present invention, the heating of the water in the chambers of the filter press is done by radio frequency heating. Radio frequency heating, also referred to as dielectric heating, occurs due to dielectric losses in a material exposed to a changing electric field. An apparatus for dielectric heating at lower frequencies may include parallel metal plates with a changing potential difference applied at a frequency somewhere in the range of 1 to 100 megahertz; particular frequencies that have been set aside by the United States FCC for dielectric heating are 13.56, 27.12 and 40.68 MHz. Material is placed or moved between the parallel plates in order to be heated. Microwave heating of materials is a sub-category of dielectric heating within a frequency range of approximately 300 to 3000 MHz. A variety of radio frequency sources and apparatuses are described herein. However, other radio frequency sources and apparatuses operating within the frequency range from 1 MHz to 3 GHz may be used according to the principles and teaching of the present invention.

Radio frequency heating provides a potentially very efficient method of directly heating the filter cake within the chambers in the filter press. This may be achieved by choosing a radio frequency for which the filter cake has strong absorption of the radio frequency energy and fabricating the filter press out of materials with weak radio frequency absorption at the chosen frequency. Direct heating of the filter cake also has the advantage of removing the need for indirect heating. (Indirect heating of the filter cake by passing steam through the filter plates can result in thermal problems for plastic filter plates such as softening.) For example, for dewatering of drilling muds, there are frequencies for which water is strongly absorbing and for which plastics materials/polymers, out of which filter plates may be made, is weakly absorbing. More details of radio frequency heating integrated with a filter press are provided in U.S. patent application Ser. No. 12/590,150, filed Nov. 2, 2009, entitled Filter-Press with Integrated Radio Frequency Heating to Daniel J. Simpson et al., incorporated by reference in its entirety herein.

As is well known in the art, filter presses include a stack of filter plates, the filter plates are covered by filter cloths, and each pair of filter plates defines a chamber lined with filter cloths into which slurry or other material is fed for dewatering or similar processing. Generally, there will be a stack of N filter plates in a filter press, and M chambers between the plates, where M=N−1 and M and N are integers. Details of filter plates which are representative of those manufactured and installed worldwide by DES, Inc., DryVac Canada, Ltd. and affiliated companies are provided below and in FIGS. 5-9. Filter plates are also described in U.S. Pat. Nos. 5,672,272 and 6,149,806 to William Baer, incorporated by reference in their entirety herein.

The schematic illustrations of FIGS. 3A-3D is used to describe a method of separating a mixture of liquid and insoluble solids using a filter press system, such as the filter press system shown in FIG. 2, according to some embodiments of the present invention. The illustrations in FIGS. 3A-3D show a cross-sectional view of a block of three adjacent filter plates in the filter press for four different process steps. Each of the filter plates is shown to comprise a frame 110 around the periphery of the plate, a diaphragm 120 in the center of the plate, the diaphragm containing a hollow envelope 130 which can be inflated or deflated in order to squeeze the filter cake 24 which sits in chambers between the filter plates. Filtrate 22 is removed from the filter press through ducts as shown.

Figure 3A:
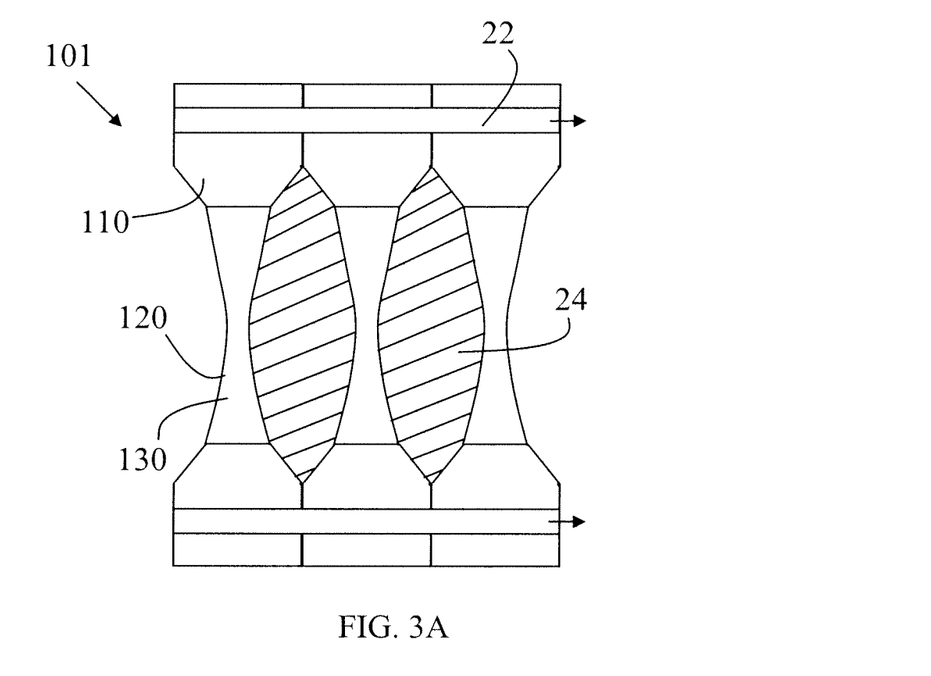
FIGS. 3A-3D are a representation of a process for separation of a mixture of liquid and insoluble solids using a filter press, according to some embodiments of the present invention.
Figure 3B:
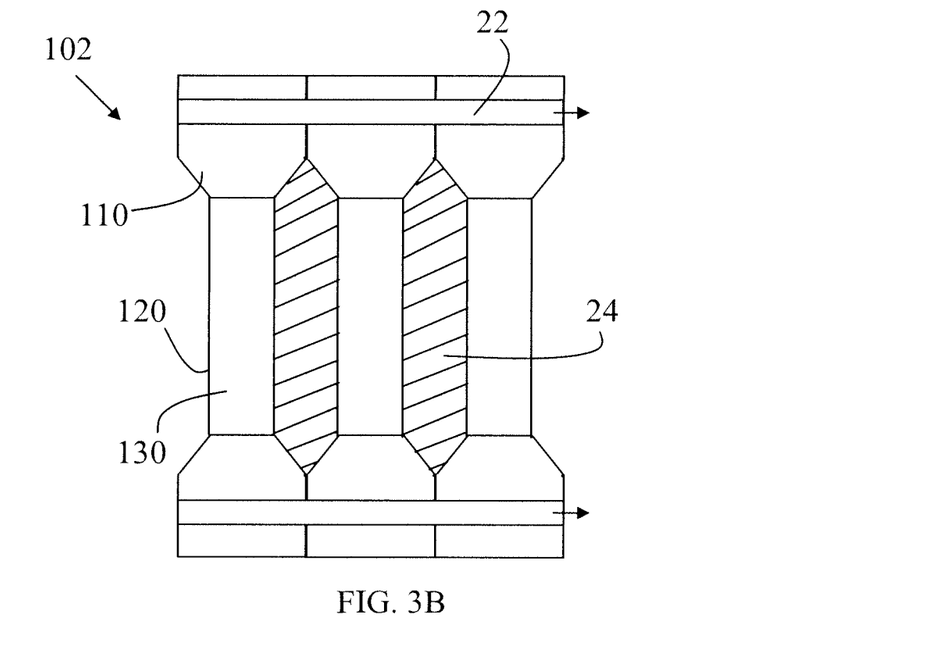
Figure 3C:
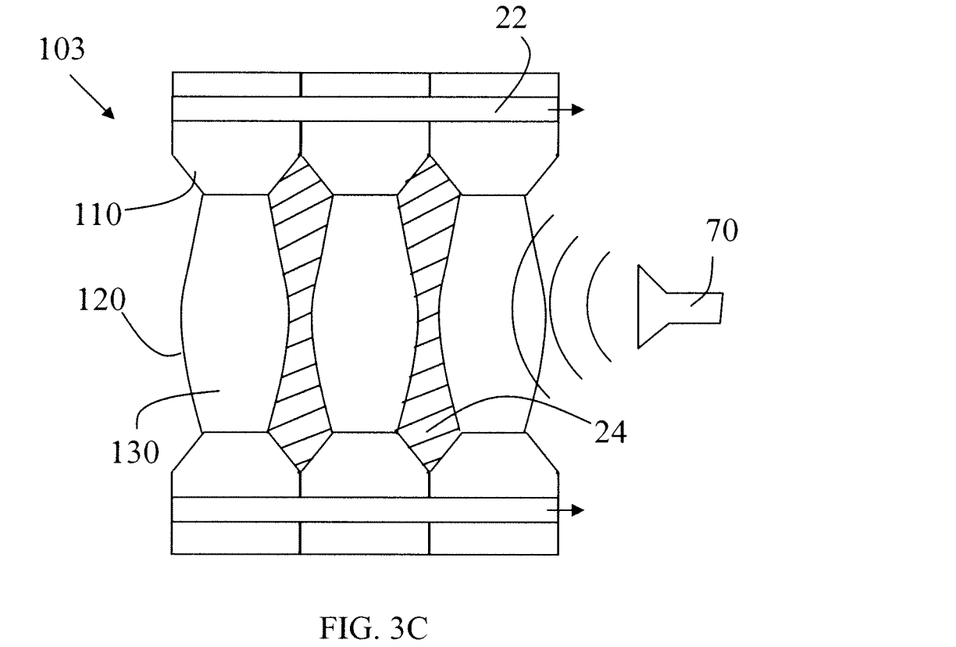
Figure 3D:
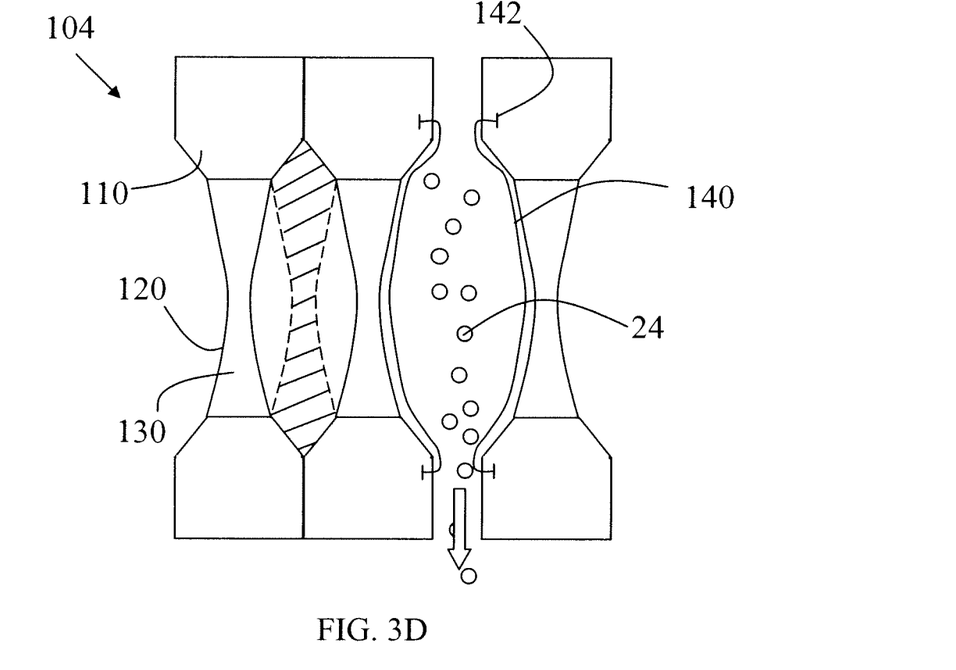

A mixture of liquid and insoluble solids is fed into the chambers of a filter press, forming a filter cake 24 in the chambers. As the mixture is forced into the chambers, some of the filtrate 22 is lost through filter cloth which lines the chambers and leaves the filter press through ducts in the filter plates. This is shown in FIG. 3A—note that the envelopes 130 are not inflated at this point in the process. The filter cake 24 is squeezed by inflating the envelopes 130 in the filter plates, while blowing compressed air through the filter cake. Both the squeezing and blowing act to remove filtrate from the filter cake and act together efficiently, although the squeezing and blowing may be used separately or just one of the squeezing or blowing may be used. FIG. 3B shows the envelopes 130 partially inflated, by compressed air, for squeezing the filter cake 24 in the chambers. The filter cake 24 is directly heated in the chambers by radio frequency irradiation, while pulling a vacuum on the filter cake. The envelopes 130 are still inflated by compressed air. FIG. 3C shows radio frequency heating by radio frequency irradiation from a radio frequency source 70, such as a microwave source. The combination of pulling a vacuum on the filter cake 24 in the chambers and the inflation of the envelopes 130 by compressed air squeezes more filtrate 22 out of the filter cake 24 and reduces the volume of the chambers. Note that the filtrate 22 may be removed from the filter cake 24 as a vapor or a liquid, depending on the physical properties of the filtrate and the environmental conditions in the chamber—specifically temperature and pressure. The filter press is opened and the dried filter cake 24 is released. At this point in the process the radio frequency heating has been stopped, the vacuum is no longer applied to the filter cake and the envelopes 130 have been deflated. As shown in FIG. 3D, the filter plates are separated to allow the dried filter cake 24 to fall out of the chambers and to be collected. Each of the chambers is lined with filter cloths 140, which are kept in position by retaining strips 142. See the right hand chamber in FIG. 3D for an illustration of the filter cloths; for ease of illustration of other features, the filter clothes have not been shown in the other chambers of FIGS. 3A-3D.

Figure 5:
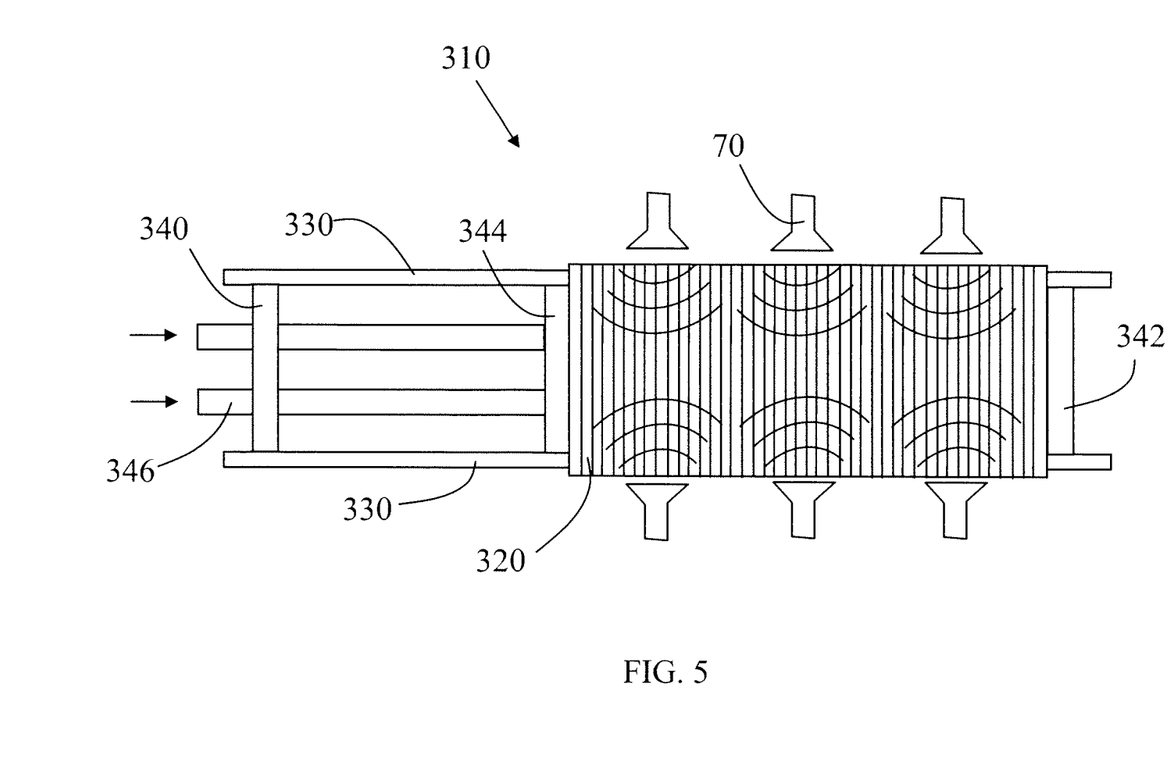
FIG. 5 is a top view representation of a filter press with integrated microwave heating using microwave horns, according to some embodiments of the present invention.
Figure 6A:
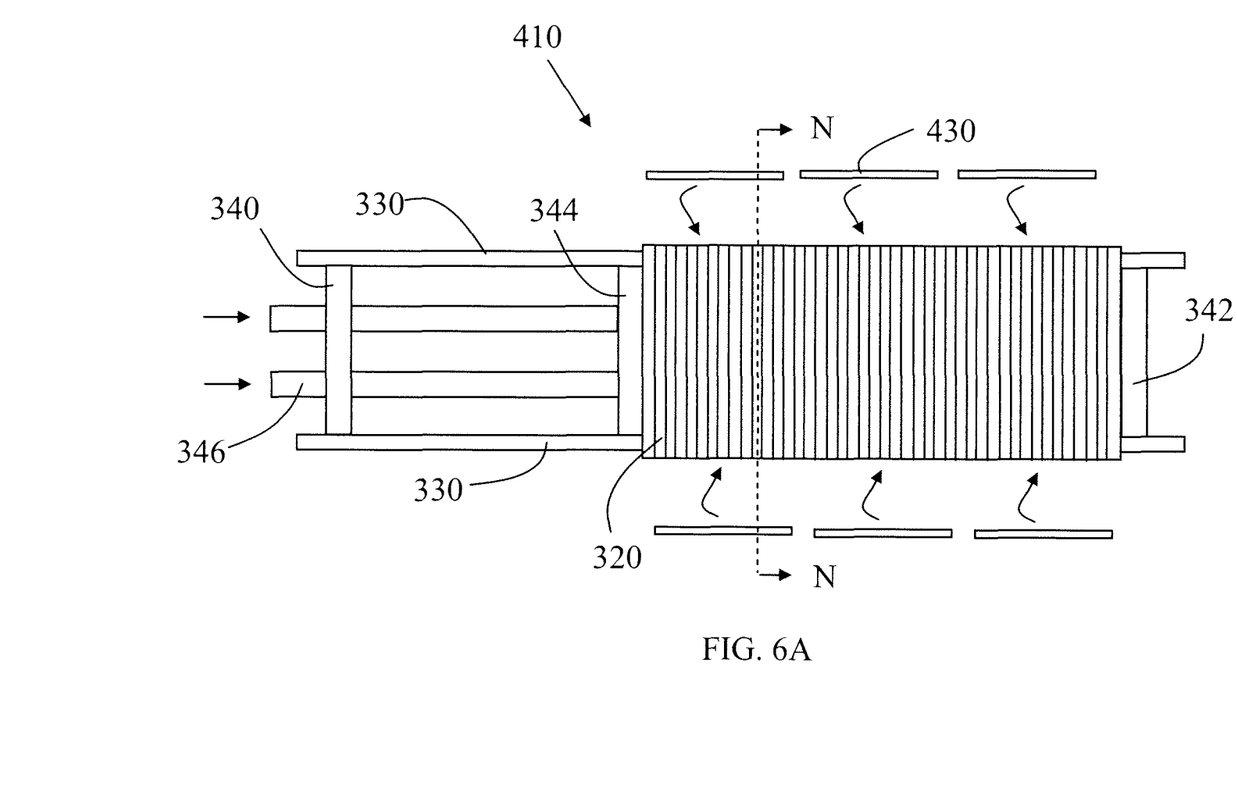
FIG. 6A shows a top view of a filter press with integrated radio frequency heating using parallel plate electrodes, according to some embodiments of the present invention.
Figure 6B:
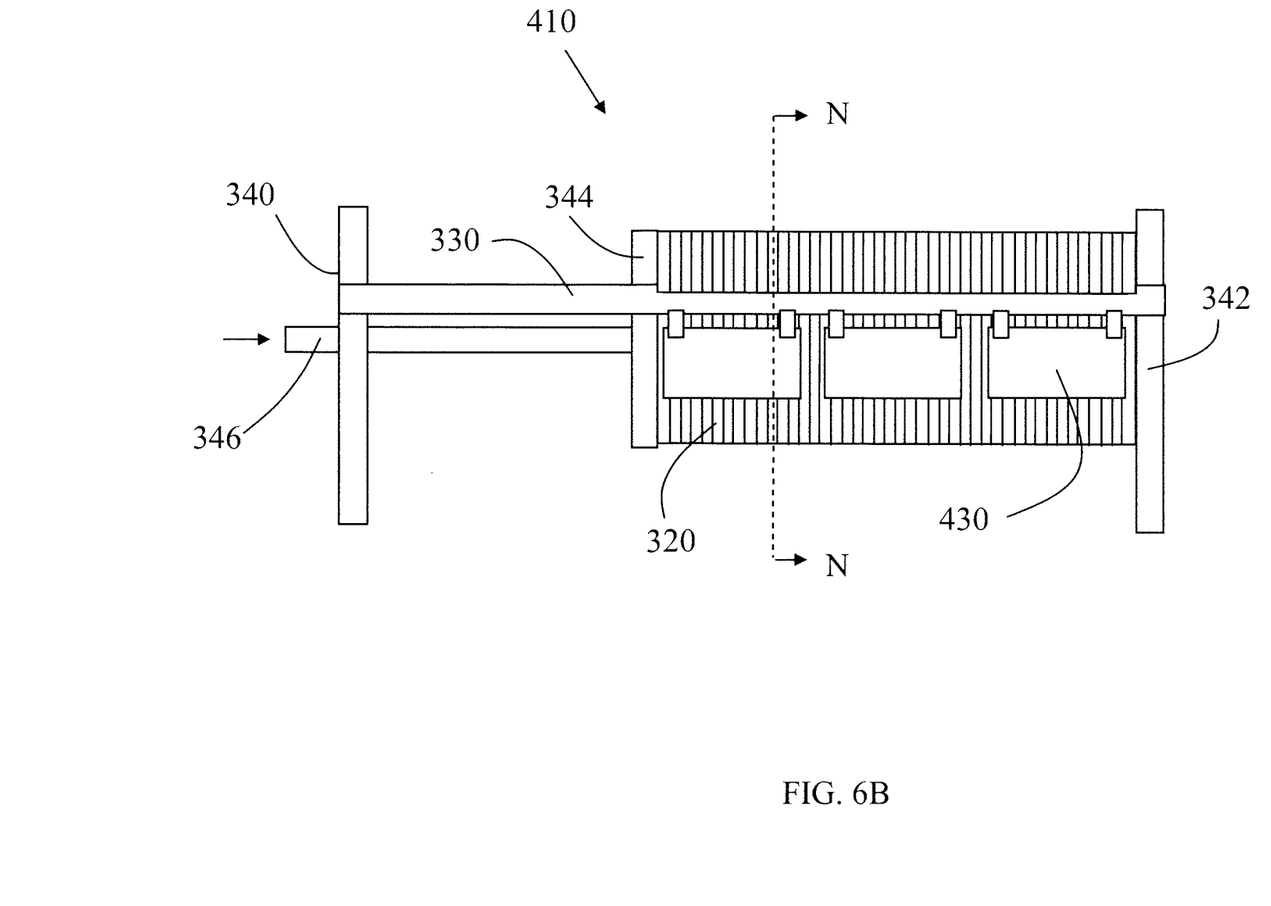
FIG. 6B shows a side view of the filter press of FIG. 6A.
Figure 7:
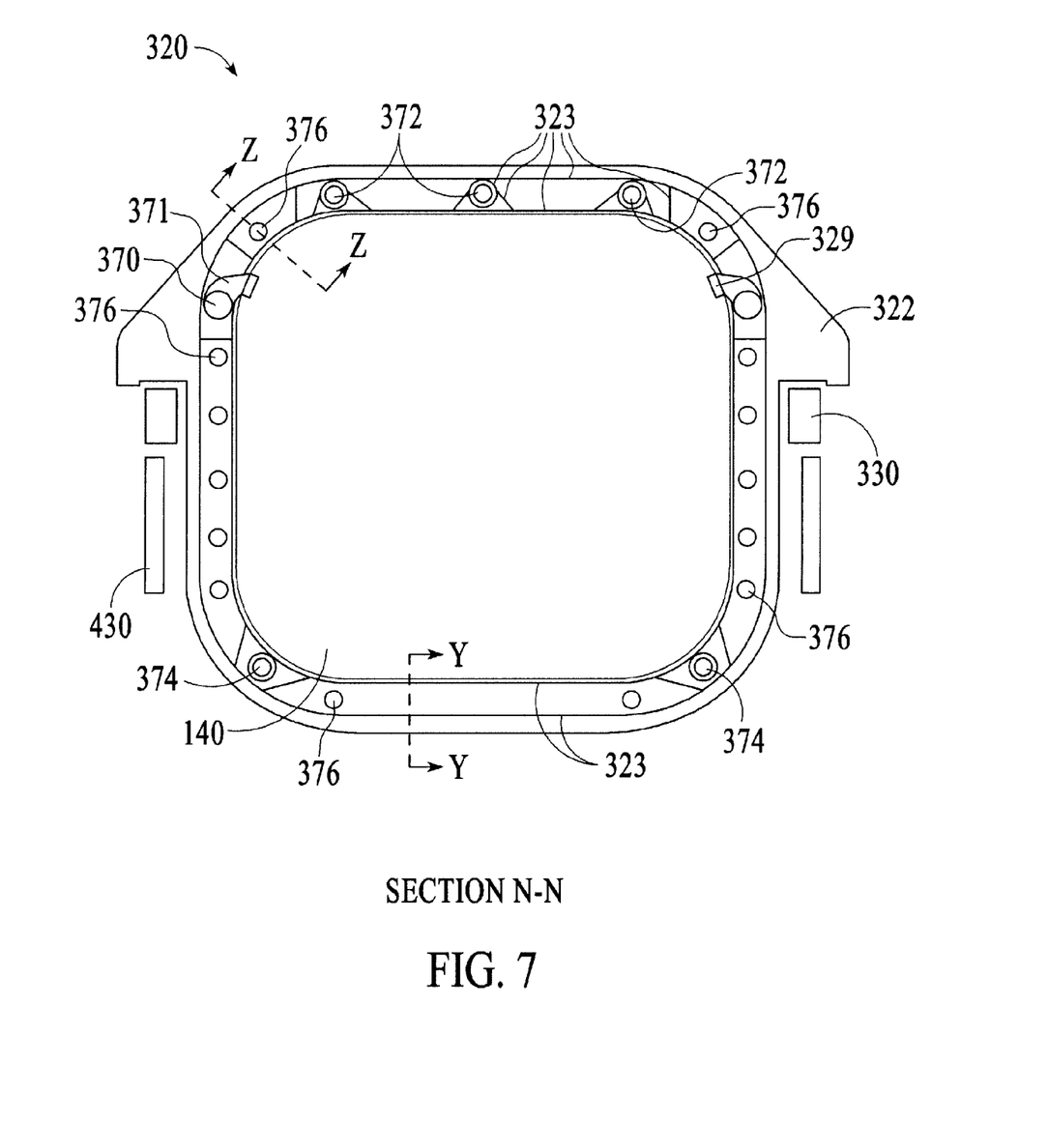
FIG. 7 is a cross section of the filter press shown in FIGS. 6A & 6B showing details of a filter plate, according to some embodiments of the present invention.

Heating of the filter cake in the filter press may be by radio frequency heating, as described above. Furthermore, U.S. patent application Ser. No. 12/590,150, filed Nov. 2, 2009, entitled Filter-Press with Integrated Radio Frequency Heating to Daniel J. Simpson et al., incorporated by reference in its entirety herein, provides more details of radio frequency heating integrated into filter presses. FIGS. 5-7 show some examples of filter presses with radio frequency heating which may be used for dewatering of drilling mud.

FIG. 5 shows a top view of a filter press 310 with integrated microwave heating using microwave horns 70, according to some embodiments of the present invention. The filter press 310 includes a stack of filter plates 320 mounted in a press comprising frame rails 330, on which the filter plates hang, fixed end plates 340 and 342, a movable plate 344, and rods 346 for applying a compressive force to the movable plate 344 as shown. Application of a compressive force to the movable plate 344 results in compressing the stack of filter plates 320. The microwave horns 70 are shown propagating radio waves into the filter press where the filter cake in the chambers absorbs the radio frequency energy and heats up. The microwave horns are arranged around the outside of the stack of filter plates so as to provide relatively uniform heating of the filter cake within. Six microwave horns 70 are shown in the figure, but more or less may be used and arranged differently to achieve uniform heating of the filter cake in the chambers.

Further combinations of microwave antennas/sources such as those shown in FIG. 5 are also envisaged. Furthermore, microwave sources are not limited to those disclosed above, but may include microwave antennas such as monopoles, dipoles, wave guides, linear structures, helical structures, etc.

FIGS. 6A & 6B show top and side views of a filter press 410 with integrated radio frequency heating using parallel plate electrodes 430, according to some embodiments of the present invention. The filter press 410 includes a stack of filter plates 320 and pairs of parallel plate electrodes 430 positioned outside the stack. In FIG. 6A, the position of the electrodes 430 is indicated by the arrows—the electrodes 430 are actually positioned under the frame rails 330, which is more clearly shown in FIG. 7. Each pair of electrodes 430 may be connected to its own radio frequency generator or a single radio frequency generator may be used for multiple pairs. The number of pairs of electrodes may be varied depending on factors such as the size of the filter press, materials limitations for the electrodes, load limitations of radio frequency generators, etc. Furthermore, in some embodiments it is envisaged that a single pair of plates 430 may be sufficient for a filter press. The placement of the electrodes 430 is determined by the desire to provide uniform heating of the filter cake within the chambers in the filter press, and also by the desire to avoid arcing between the electrodes 430 and any parts of the filter press. The electrodes 430 may conveniently be attached to the frame rails 330, although other means of fixing the electrodes in place are clearly available, such as providing a dedicated frame specifically for mounting the electrodes. Furthermore, the shape of the electrodes may be varied as required to improve the uniformity of energy deposition in the filter cake in the filter press, and also as required to reduce electrical discharge—by rounding the corners of the electrodes, for example.

FIG. 7 is a section along N-N in FIGS. 6A & 6B. The frame rails 330 and electrodes 430 are shown in cross-section; however, for purposes of clear illustration of certain features, the filter plate 320 is shown in plan view. The configuration of the frame rails 330 and electrodes 430 relative to the filter plate 320 is clearly shown. FIG. 7 also shows the handles 322 which are used to place the filter plate 320 on frame rails 330 and may also be used to move the plates along the frame rails. Filter cloth 140 is shown attached to the filter plate 320.

FIG. 7 also shows the various ports which are situated around the periphery of the filter plate 320. These ports are apertures which extend completely through the filter plate and connect with the corresponding ports on the neighboring filter plates in the stack. The drilling mud mixture is delivered through feed ports 370. The example shown in FIG. 7 is referred to as a side feed port. The configuration of the feed ports may be changed to provide top delivery, if desired. Delivery slots 371 are machined into the filter plate to allow the mixture to get from the feed port into the filter cloth lined chamber formed between adjacent filter plates. Steam ports 372 are for delivering steam into the envelope in the middle of the filter plate, and condensate ports 374 are for draining condensate from the envelope. (The envelope 130/360 is shown in FIGS. 3A-3D and 8.) Alternatively, ports 372 and 374 may be used for inflating/deflating the envelope using compressed air—when steam is not being used. Ports 376, which includes the unlabelled ports along the vertical sides of the filter plate 320, are used to connect to either compressed air during the blowing of air through the filter cake, or to vacuum when the filter cake is being heated.

Figure 8:
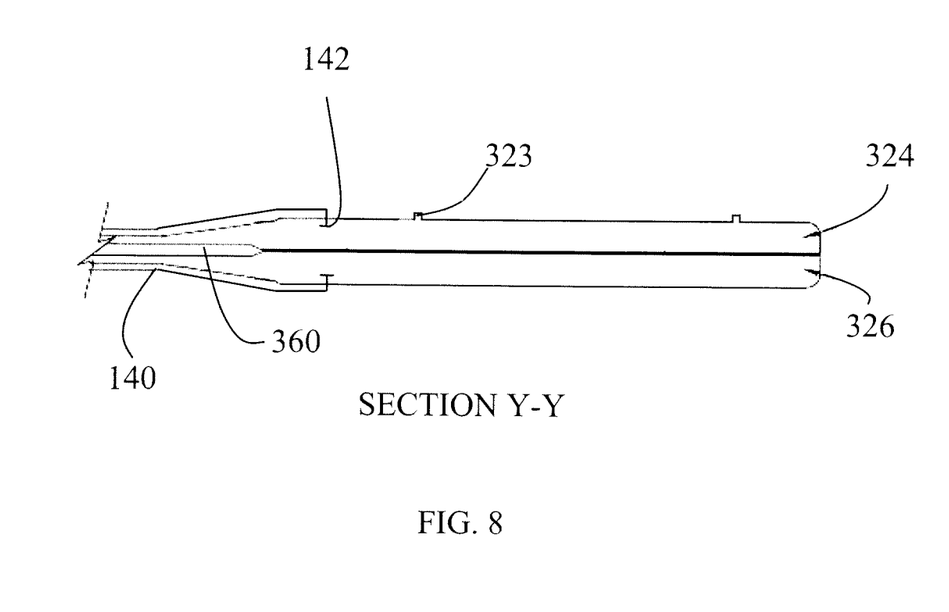
FIG. 8 is a cross-section of the filter plate of FIG. 7 showing detail of the sealing flanges, according to some embodiments of the present invention.

FIGS. 7 and 8 show compression rings/flanges 323 that may be used to form a seal between adjacent filter plates. FIG. 8 is a cross-section along Y-Y in FIG. 7. Each of the filter plates has a flange on a first side (upper part 324) and a flat surface on the second side (lower part 326). The flange has a rectangular cross-section, as shown. When the flange of a first plate is brought into contact with the flat surface of an adjacent second plate and pressure is applied, a seal is formed between the first and second plates. The flanges 323 are also seen to provide isolation for the different ports around the periphery of the filter plate, thus ensuring that vacuum ports are isolated from feed ports, for example.

FIG. 7 also shows the position of the filter cloth 140 in the central area of the filter plate 320. Note that a clamp 329 is used to fix the edge of the filter cloth at the bottom of delivery slot 371, which ensures that the mixture is directed into the filter cloth lined chamber formed between adjacent filter plates. Furthermore, FIG. 8 shows filter cloths 140 on both sides of the filter plate (the filter plate comprising upper part 324 and lower part 326). The filter cloths are held in place by retaining straps 142, which are discussed in more detail below with reference to FIG. 9.

Figure 9:
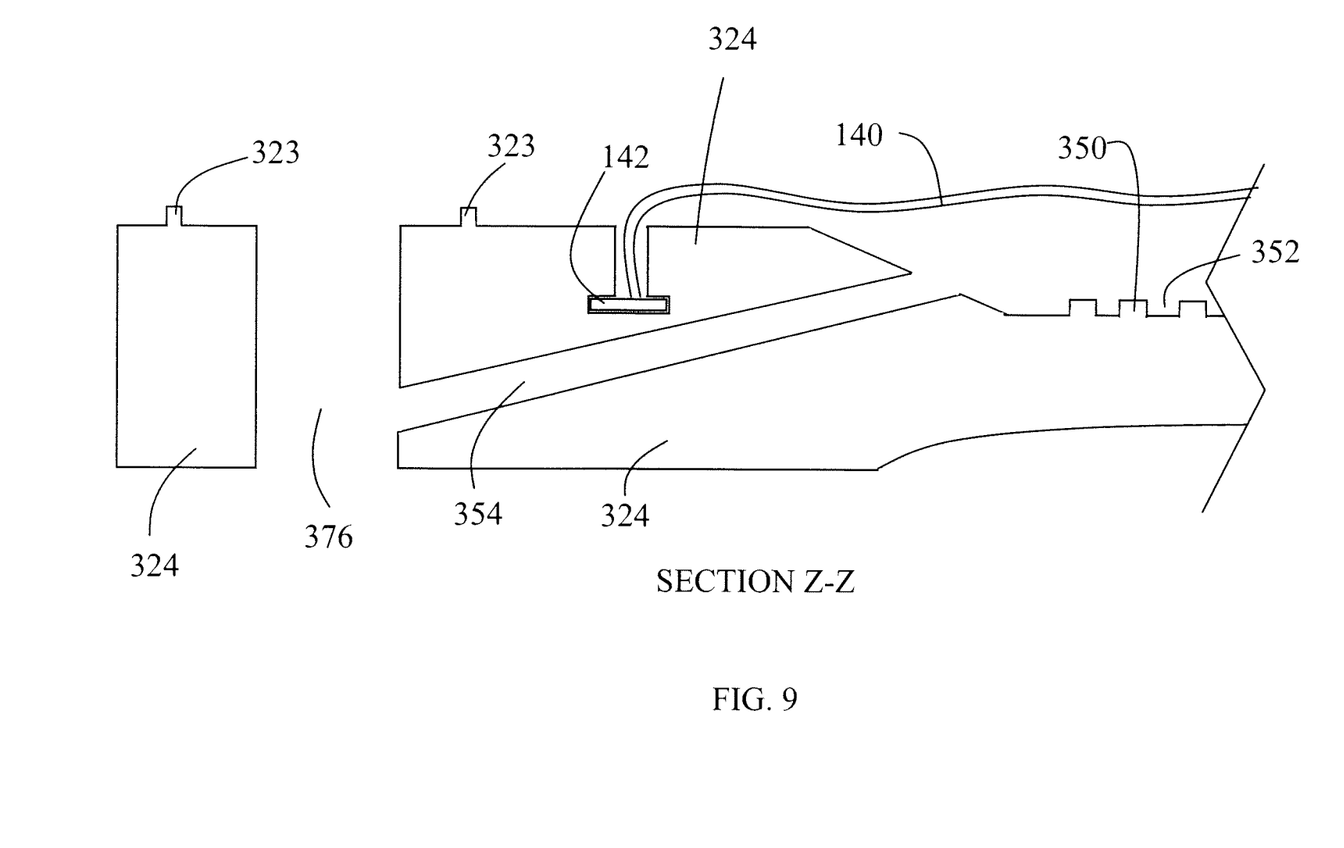
FIG. 9 is a cross section of the filter plate of FIG. 7, showing drainage holes and the retention of the filter cloth, according to some embodiments of the present invention.

FIG. 9 shows a cross-sectional representation of the upper part 324 of filter plate 320 along Z-Z in FIG. 7. The section is through a compressed air/vacuum port 376 and shows how the port 376 communicates with the chamber in between filter plates through machined hole 354. Hole 354 may have a circular cross-section in a plane orthogonal to the plane of the section. Hole 354 allows air to be forced through the filter cake or allows filtrate vapor to be vacuumed out of the chamber. Although not shown, those skilled in the art will appreciate, after reading the present disclosure, that a similar configuration may exist at the ports 372 and 374 for allowing steam or compressed air to inflate the envelope 360.

The filter cake is positioned in a chamber in between filter plates, where the chamber is lined with filter cloths 140. The section in FIG. 9 shows the filter cloth 140 at the edge of the chamber and shows how the cloth may be kept in position using a vinyl strap 142 seated in a "T" shaped slot machined in the filter plate. The vinyl strap 142 may be stitched into the edge of the filter cloth 140. The section also shows on the surface of the diaphragm part of the filter plate features 350 with channels 352 between the features. The channels are arranged so as to allow any filtrate vapor which is squeezed or vacuumed through the filter cloth 140 to pass to hole 354 and to vacuum port 376. The filter plate is similarly configured at each vacuum port 376. (See FIG. 7 for position of ports.)

The frame rails and other structural components of the filter press may be formed of carbon fiber and other non-metallic materials, as required to use radio frequency heating. The stack of filter plates may be surrounded by a radio frequency screening material, so as to reduce radio frequency radiation outside of the filter press, if needed.

Dewatering using the present invention is capable of producing dried filter cake containing less than 10% water by weight, and even less than 1% water by weight.

The dried filter cake may be further processed in a kiln (such as a rotary kiln, furnace, etc.) at approximately 2500° C. to form pieces of fused stony matter. This fired material may be suitable for use as a road base material.

In general, microwave frequencies may be well suited for small filter presses and the lower frequencies may be well suited for large filter presses. This is due to the lower frequencies being more penetrating within the filter press.

As stated above, the present invention is not limited to dewatering of drilling muds—the teaching and principles of the present invention may be applicable to processing the contents of tailing ponds from mining, strip mining, etc., and to the dewatering of muds generally. For example, the teaching of the present invention may be used in the dewatering of mature fine tailings; furthermore, following the teaching of the present invention the mature fine tailings may be bulked up using sand, if available at the site, prior to chemical processing and dewatering in a filter press.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of separating a mixture of liquid and insoluble solids in a filter press, said method comprising:
    providing said mixture, said mixture being recycled drilling mud with drill cuttings removed;
    diluting said mixture;
    adding a flocculating agent to the diluted mixture and stirring to form a chemically processed mixture;
    pumping said chemically processed mixture into a chamber between two filter plates in said filter press for separating said chemically processed mixture into a filter cake and a filtrate, wherein, during said pumping said filter cake is formed in said chamber, said chamber being lined by filter cloths, and wherein, during said pumping, a first portion of said filtrate is forced through said filter cloths and out of said chamber;
    heating said filter cake in said chamber to form a dried filter cake, wherein, during said heating, a second portion of said filtrate is forced through said filter cloths and out of said chamber; and
    releasing said dried filter cake from said chamber;
    wherein said filter press comprises a multiplicity of said filter plates and a multiplicity of said chambers, wherein said heating is by radio frequency irradiation of said filter cake in said multiplicity of chambers, and wherein said radio frequency irradiation is applied by a system including at least one pair of parallel opposed electrode plates configured with the planes of said at least one pair of parallel opposed electrode plates roughly orthogonal to the planes of each of said multiplicity of filter plates, with each of said parallel opposed electrode plates for each of said at least one pairs being on opposite sides of, external to, and in close proximity to said multiplicity of filter plates.

2. The method as in claim 1, wherein said diluting said mixture includes adding water in a volume roughly twice that of the volume of said drilling mud and blending to provide a uniform solution.

3. The method as in claim 1, further comprising, before said diluting, adding additional solids to said mixture.

4. The method as in claim 1, wherein said flocculating agent is a mineral flocculant.

5. The method as in claim 4, wherein said mineral flocculant is alum.

6. The method as in claim 1, wherein said flocculating agent is a synthetic flocculant.

7. The method as in claim 6, wherein said synthetic flocculant is a cationic polyacrylamide.

8. The method as in claim 6, wherein said synthetic flocculant is an anionic polymer.

9. The method as in claim 1, further comprising, after said adding:
    letting a floc formed in said chemically processed mixture settle; and
    siphoning off liquid separated from said floc.

10. The method as in claim 1, further comprising repeating said pumping and said heating before said releasing.

11. The method as in claim 1, further comprising, during said heating, vacuum pumping said chamber.

12. The method as in claim 1, wherein said second portion of said filtrate forced through said filter cloths and out of said chamber during said heating includes filtrate vapor.

13. The method as in claim 1, wherein said filtrate is water and said dried filter cake contains less than 10% water by weight.

14. The method as in claim 13, wherein said dried filter cake contains less than 1% water by weight.

15. The method as in claim 1, wherein said radio frequency irradiation is microwave irradiation.

16. The method as in claim 15, wherein said microwave irradiation is at a frequency between 300 and 3000 MHz.

17. The method as in claim 1, wherein said radio frequency irradiation is at a frequency between 1 and 100 MHz.

18. The method as in claim 1, wherein said heating further comprises heating by heat transfer from said filter plates to said filter cake.

19. The method as in claim 18, wherein said multiplicity of filter plates are heated by steam.

20. The method as in claim 18, wherein each of said filter plates includes an envelope, said envelope being filled by steam.

21. The method as in claim 1, further comprising squeezing said filter cake in said chamber.

22. The method as in claim 21, wherein each of said filter plates includes an envelope, said envelope being inflatable by a fluid, and wherein said squeezing includes inflating said envelopes with said fluid.

23. The method as in claim 22, wherein said fluid is steam.

24. The method as in claim 22, wherein said fluid is compressed air.

25. The method as in claim 1, wherein said multiplicity of said filter plates is N filter plates and said multiplicity of said chambers is M chambers, M is equal to N−1, and N and M are integers.

26. The method as in claim 1, further comprising firing said dried filter cake in a kiln.

27. The method as in claim 1, wherein said pumping is low shear pumping.

28. The method as in claim 1, wherein said recycled drilling mud is drilling mud processed by being flowed over shale shakers with progressively finer mesh screens.

29. A method of separating a mixture of liquid and insoluble solids in a filter press including a plurality of filter plates, said method comprising:
    providing said mixture, said mixture being recycled drilling mud with drill cuttings removed;
    diluting said mixture;
    adding a flocculating agent to the diluted mixture and stirring to form a chemically processed mixture;
    pumping said chemically processed mixture into a multiplicity of chambers for separating said chemically processed mixture into a filter cake and a filtrate, each of said multiplicity of chambers being between adjacent filter plates of said plurality of filter plates, each of said multiplicity of chambers being lined by filter cloths, wherein, during said pumping, said filter cake is formed in said multiplicity of chambers and wherein, during said pumping, a first portion of said filtrate is forced through said filter cloths and out of said multiplicity of chambers;

heating said filter cake in said multiplicity of chambers to form a dried filter cake, wherein, during said heating, a second portion of said filtrate is forced through said filter cloths and out of said multiplicity of chambers; and releasing said dried filter cake from said multiplicity of chambers;

wherein said heating is by radio frequency irradiation of said filter cake in said multiplicity of chambers, and wherein said radio frequency irradiation is applied by a system including at least one pair of parallel opposed electrode plates configured with the planes of said at least one pair of parallel opposed electrode plates roughly orthogonal to the planes of each of said plurality of filter plates, with each of said parallel opposed electrode plates for each of said at least one pairs being on opposite sides of, external to, and in close proximity to said plurality of filter plates.

30. The method as in claim 29, wherein said plurality is N and said multiplicity is M, M is equal to N−1, and N and M are integers.

31. The method as in claim 29, wherein said recycled drilling mud is drilling mud processed by being flowed over shale shakers with progressively finer mesh screens.

32. A method of separating a mixture of liquid and insoluble solids in a filter press, said method comprising:
providing said mixture;
providing additional solids, said additional solids being separate from said mixture;
adding said additional solids to said mixture to form a solids-enriched mixture;
pumping said solids-enriched mixture into a chamber between two filter plates in said filter press for separating said solids-enriched mixture into a filter cake and a filtrate, wherein, during said pumping a filter cake is formed in said chamber, said chamber being lined by filter cloths, and wherein, during said pumping, a first portion of said filtrate is forced through said filter cloths and out of said chamber;
heating said filter cake in said chamber to form a dried filter cake, wherein, during said heating, a second portion of said filtrate is forced through said filter cloths and out of said chamber; and
releasing said dried filter cake from said chamber;
wherein said filter press comprises a multiplicity of said filter plates and a multiplicity of said chambers, wherein said heating is by radio frequency irradiation of said filter cake in said multiplicity of chambers, and wherein said radio frequency irradiation is applied by a system including at least one pair of parallel opposed electrode plates configured with the planes of said at least one pair of parallel opposed electrode plates roughly orthogonal to the planes of each of said multiplicity of filter plates, with each of said parallel opposed electrode plates for each of said at least one pairs being on opposite sides of, external to, and in close proximity to said plurality multiplicity of filter plates.

33. The method as in claim 32, wherein said mixture is drilling mud and said additional solids is drill cuttings.

34. The method as in claim 32, wherein said adding said additional solids to said mixture to form said solids-enriched mixture includes adding said additional solids and said mixture to a mixing vessel.

35. A method of dewatering drilling mud in a filter press, said method comprising:
providing said drilling mud;
providing drill cuttings, said drill cuttings being physically separate from said drilling mud;
adding said drilling mud and said drill cuttings to a mixing vessel;
mixing together said drilling mud and said drill cuttings in said mixing vessel to form a mixture;
diluting said mixture to form a diluted mixture;
adding a flocculating agent to said diluted mixture and stirring to form a chemically processed mixture;
pumping said chemically processed mixture into a chamber between two filter plates in said filter press for separating said chemically processed mixture into a filter cake and a filtrate, wherein, during said pumping said filter cake is formed in said chamber, said chamber being lined by filter cloths, and wherein, during said pumping, a first portion of said filtrate is forced through said filter cloths and out of said chamber;
heating said filter cake in said chamber to form a dried filter cake, wherein, during said heating, a second portion of said filtrate is forced through said filter cloths and out of said chamber; and
releasing said dried filter cake from said chamber;
wherein said filter press comprises a multiplicity of said filter plates and a multiplicity of said chambers, wherein said heating is by radio frequency irradiation of said filter cake in said multiplicity of chambers and wherein said radio frequency irradiation is applied by a system including at least one pair of parallel opposed electrode plates configured with the planes of said at least one pair of parallel opposed electrode plates roughly orthogonal to the planes of each of said multiplicity of filter plates, with each of said parallel opposed electrode plates for each of said at least one pairs being on opposite sides of, external to, and in close proximity to said multiplicity of filter plates.

36. The method as in claim 35, wherein said mixing is low shear mixing.

\* \* \* \* \*